(12) United States Patent
Buck et al.

(10) Patent No.: US 8,248,300 B2
(45) Date of Patent: Aug. 21, 2012

(54) SYSTEM AND METHOD OF COMPENSATING FOR MICRO-JUMP EVENTS

(75) Inventors: Timothy M Buck, Oakdale, MN (US); Lawrence C. Vallot, Lake Elmo, MN (US)

(73) Assignee: Honeywell International Inc., Morristown, NJ (US)

(*) Notice: Subject to any disclaimer, the term of this patent is extended or adjusted under 35 U.S.C. 154(b) by 303 days.

(21) Appl. No.: 12/792,546

(22) Filed: Jun. 2, 2010

(65) Prior Publication Data

US 2011/0298661 A1    Dec. 8, 2011

(51) Int. Cl.
*G01S 19/23* (2010.01)

(52) U.S. Cl. .................................. 342/357.62
(58) Field of Classification Search ............. 342/357.62
See application file for complete search history.

(56) References Cited

U.S. PATENT DOCUMENTS

| | | | |
|---|---|---|---|
| 4,894,662 A * | 1/1990 | Counselman | 342/357.25 |
| 5,343,209 A | 8/1994 | Sennott et al. | |
| 5,398,034 A | 3/1995 | Spilker, Jr. | |
| 5,737,374 A | 4/1998 | Jeanclaude et al. | |
| 5,798,732 A | 8/1998 | Eshenbach | |
| 5,854,605 A | 12/1998 | Gildea | |
| 5,917,445 A | 6/1999 | Schipper | |
| 5,983,160 A | 11/1999 | Horslund et al. | |
| 6,067,503 A * | 5/2000 | Yakos | 701/468 |
| 6,088,653 A | 7/2000 | Sheikh et al. | |
| 6,114,988 A | 9/2000 | Schipper et al. | |
| 6,167,347 A | 12/2000 | Lin | |
| 6,278,403 B1 | 8/2001 | Peng et al. | |
| 6,311,129 B1 * | 10/2001 | Lin | 701/472 |
| 6,313,789 B1 | 11/2001 | Zhodzishsky et al. | |
| 6,331,835 B1 | 12/2001 | Gustafson et al. | |
| 6,448,925 B1 | 9/2002 | Shridhara | |
| 6,630,904 B2 | 10/2003 | Gustafson | |
| 6,661,371 B2 | 12/2003 | King et al. | |
| 6,731,237 B2 | 5/2004 | Gustafson et al. | |
| 6,900,760 B2 | 5/2005 | Groves | |
| 7,061,425 B2 | 6/2006 | Greier et al. | |
| 7,236,883 B2 | 6/2007 | Garin et al. | |
| 7,248,964 B2 | 7/2007 | Bye | |

(Continued)

OTHER PUBLICATIONS

Alban et al., "Performance Analysis and Architectures for INS-Aided GPS Tracking Loops", 2003, Publisher: Institute of Navigation's National Technical Meeting, Published in: Anaheim, CA.

(Continued)

*Primary Examiner* — Jack W Keith
*Assistant Examiner* — Frank J McGue
(74) *Attorney, Agent, or Firm* — Fogg & Powers LLC

(57) ABSTRACT

A system comprises a Global Navigation Satellite System (GNSS) receiver configured to acquire and track a unique radio frequency (RF) signal for each of a plurality of channels, wherein the GNSS receiver is configured to provide one or more system state measurements based on the unique RF signals; processing functionality configured to calculate a respective code delay error for each of the plurality of channels based on the respective unique RF signal; and micro jump detection functionality configured to calculate an average code delay error across all of the plurality of channels based on the plurality of calculated code delay errors, wherein the micro jump detection functionality is further configured to compare the calculated average code delay error to an error threshold to detect a micro jump event when the calculated average code delay error exceeds the error threshold.

20 Claims, 6 Drawing Sheets

U.S. PATENT DOCUMENTS

| | | | |
|---|---|---|---|
| 7,388,539 | B2 | 6/2008 | Whitehead et al. |
| 7,495,607 | B1 | 2/2009 | Zhodzishsky et al. |
| 7,579,984 | B2 | 8/2009 | Wang et al. |
| 7,859,454 | B2 * | 12/2010 | Abraham ............... 342/357.62 |
| 2005/0270997 | A1 * | 12/2005 | Julien et al. ............... 370/315 |
| 2006/0071851 | A1 | 4/2006 | Graas et al. |
| 2008/0082266 | A1 | 4/2008 | Bye et al. |
| 2008/0238772 | A1 | 10/2008 | Soloviev et al. |

OTHER PUBLICATIONS

"The Design and Performance of Precision Miniature TOXOs", "App Note", 2006, Publisher: Greenray.

Babu, Ravindra and Jinling Wang, "Ultra-Tight GPS/INS/PL Integration: Kalman Filter Performance Analysis", "Int. Symp. on GPS/GNSS", Dec. 2005, Publisher: Satellite Navigation and Positioning Lab, Published in: Hong Kong.

Bhatti, Umar Iqbal, "Improved Integrity Algorithms for Integrated GPS/INS Systems in the Presence of Slowly Growing Errors", "Thesis—Doctor of Philosophy", Mar. 2007, Publisher: University of London.

"The Draper Technology Digest", "CSDL-R-3009", 2007, vol. 11, Publisher: The Charles Stark Draper Laboratory Inc., Published in: Cambridge, MA.

Gustafson et al., "A High Antijam GPS-Based Navigator", "The Institute of Navigation National Technical Meeting", 2000, pp. 4-13, Publisher: ION, Published in: Anaheim, CA.

Lashley, Matthew, "Kalman Filter Based Tracking Algorithms for Software GPS Receivers", "Thesis", Dec. 15, 2006, Publisher: Auburn University, Published in: Auburn, AL.

Lewis, David E., "Ultra-Tightly Coupled GPS/INS Tracking Performance", "AIAA's 3rd Annual Aviation Technology, Integration, and Operations (ATIO) Tech", Nov. 17-19, 2003, p. 1 Publisher: AIAA.

Li et al., "Development of a GPS/INS Integrated System on the Field Programmable Gate Array Platform", "Proceedings of ION GNSS 2006", Sep. 2006, Published in: Forth Worth, Texas.

Loffler, Thomas and Dr. Jurgen Metzger, "Ultra tightly coupled GNSS/INS navigation and requirements for future deeply coupled systems", "Proceedings of ENC-GNSS", 2009, Publisher: Istituto Italiano di Navigazione, Published in: Naples, Italy.

Riley, W. J., "Algorithms for Frequency Jump Detection", "Metrologia", 2008, pp. S154-S161, vol. 45, Publisher: IOP Publishing.

Scherzinger, Bruno M., "Precise Robust Positioning with Inertial/GPS RTK", 2003, Publisher: Umea University, Published in: Washington D.C.

Schmidt, George and Richard Phillips, "INS/GPS Integration Architectures", "RTO-EN-SET-116", May 2009, pp. 4-1 thru 4-16, Publisher: NATO Research and Technology Organisation.

Soloviev, Andrey, "Utilizing Batch Processing for GNSS Signal Tracking", "Ohio University", Feb. 27, 2007, Publisher: Avionics Engineering Center, Published in: Calgary, Canada.

Vittorini, Larry D., "Micro-Jump Screening Station for GPS User Equipment", "IEEE International Frequency Control Symposium", 1997, pp. 373-381, Publisher: IEEE.

* cited by examiner

SYSTEM AND METHOD OF COMPENSATING FOR MICRO-JUMP EVENTS

BACKGROUND

Global Navigation Satellite System (GNSS) receivers provide navigation measurements, such as position or velocity measurements, based on radio frequency (RF) signals received from a plurality of satellites. For example, a typical GNSS receiver will track at least four satellite RF signals to calculate navigation measurements. The GNSS receiver can operate independently or be integrated with other navigation devices, such as an Inertial Navigation System (INS). If the GNSS receiver loses lock on the tracked RF signals, the navigation solution will be degraded.

SUMMARY

In one embodiment a system is provided. The system comprises a Global Navigation Satellite System (GNSS) receiver configured to acquire and track a unique radio frequency (RF) signal for each of a plurality of channels, wherein the GNSS receiver is configured to provide one or more system state measurements based on the unique RF signals; processing functionality configured to calculate a respective code delay error for each of the plurality of channels based on the respective unique RF signal; and micro jump detection functionality configured to calculate an average code delay error across all of the plurality of channels based on the plurality of calculated code delay errors, wherein the micro jump detection functionality is further configured to compare the calculated average code delay error to an error threshold to detect a micro jump event when the calculated average code delay error exceeds the error threshold.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
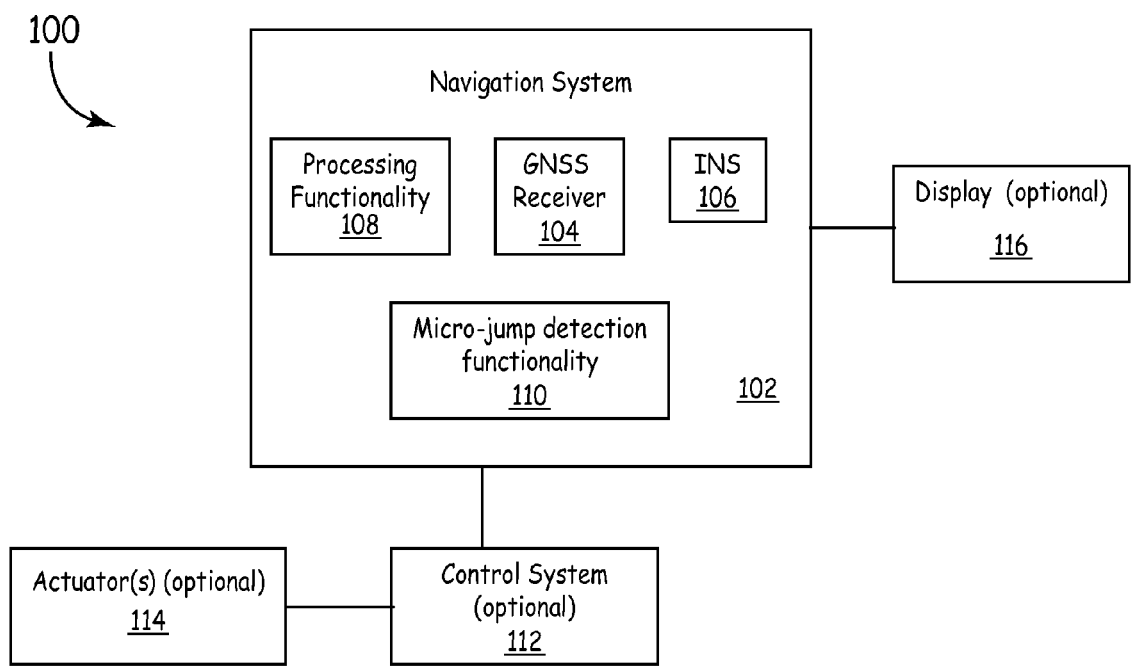
FIG. 1 is a block diagram of one embodiment of a guidance system.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the methods presented in the drawing figures and the specification are not to be construed as limiting the order in which the individual acts may be performed. The following detailed description is, therefore, not to be taken in a limiting sense.

FIG. 1 is a block diagram of one embodiment of a guidance system 100. The guidance system 100 can be implemented in manned or unmanned vehicles, such as, but not limited to, aircraft, automobiles, and unmanned aerial vehicles (UAV). In other embodiments, the guidance system 100 is implemented in guided projectiles, such as, but not limited to guided missiles and guided rockets. The guidance system 100 includes navigation system 102 and control system 112. The navigation system 102 calculates navigation parameters such as position, velocity, acceleration, rotation rate, etc. In some embodiments, such as in a manned vehicle, the navigation parameters are output to a display unit 116. For example, in some embodiments, the display unit 116 displays the geographic location, velocity, and/or orientation (e.g. pitch, roll, and/or yaw) of a vehicle in which the navigation system 102 is located. The display unit 116 can be implemented using any suitable display technology such as, but not limited to, various CRT, active and passive matrix LCD, and plasma display units.

In other embodiments, such as in guided projectiles or unmanned vehicles, the display unit 116 is omitted. In some such embodiments, the navigation system 102 outputs the navigation parameters to the control system 112. The control system 112 analyzes the navigation parameters to calculate control commands. The control commands are then output to one or more actuators 114 which adjust the motion of the projectile or vehicle based on the control commands. The particular actuators 114 depend on the implementation of guidance system 100. For example, in a guided projectile, the one or more actuators 114 can include thrusters and flaps.

The navigation system 102 includes a Global Navigation Satellite System (GNSS) receiver 104, such as a Global Positioning System (GPS) or Galileo system receiver. The navigation system 102 also includes an inertial navigation system (INS) 106. Each of the GNSS receiver 104 and the INS 106 provides navigation measurements to processing functionality 108. Processing functionality 108 blends the measurements from each of the GNSS receiver 104 and the INS 106 to improve resistance to noise and jamming as well as improve the navigation solution accuracy. For example, if a lock on GNSS satellite signals is lost, navigation system 102 uses the data from INS 106 until the GNSS signals are reacquired.

In addition, in this embodiment, navigation system 102 is an ultra-tightly coupled or deeply integrated navigation system. In a deeply integrated system, the signal tracking loops of the GNSS receiver 104 are controlled by the processing functionality 108 rather than by the GNSS receiver 104. For example, the processing functionality 108 tracks the GNSS satellite signals collectively rather than as single independent channels. Additionally, the processing functionality 108 provides code and carrier numerically controlled oscillator (NCO) commands to the GNSS receiver 104 for tracking the GNSS satellite signals. Typical operation of a deeply integrated system is known to one of skill in the art.

The navigation system 102 also includes micro jump detection functionality 110. Micro jump detection functionality 110 detects the occurrence of a micro jump event (also referred to herein as a micro-jump). As used herein, a micro jump is defined as a disjoint or step change in frequency. Some causes of micro jumps can include, but are not limited to; reference oscillator temperature induced mechanical stresses or contaminants in an oscillator cavity. A sufficiently large micro jump can cause the signal tracking loops to be driven out of lock and result in a loss of track of the GNSS signal. For example, in some implementations a micro jump of 20 parts per billion (ppb) can be sufficient to cause a loss of track.

Micro jump detection functionality 110 detects the occurrence of a micro jump and initiates actions to mitigate or compensate for the effects of the micro jump as described in more detail below. In particular, an exemplary implementation of micro-jump detection functionality in a deeply integrated system is described in more detail below with respect to the exemplary navigation system 202 shown in FIG. 2.

The navigation system 202 includes a GNSS receiver 204, INS 206, processing functionality 208, and micro jump detection functionality 210. The GNSS receiver 204 includes at least one antenna 220 for receiving radio frequency (RF) signals from each of a plurality of GNSS satellites. As used herein, the terms RF signal and GNSS signal are used interchangeably. Each satellite transmits the RF signal at a predetermined carrier frequency. Each RF signal is modulated with a code sequence that is orthogonal to the code sequence of the RF signal from each of the other satellites. The RF signal received from each satellite and processed in the navigation system 202 is associated with a respective tracking channel.

The GNSS receiver 204 also includes RF front end 218. The RF front end 218 down-converts the received RF signals for each channel to an intermediate frequency via mixing stages with a local oscillator (LO) as known to one of skill in the art. For example, GNSS receiver 204 includes a clock 224, such as a quartz oscillator, which generates a local clock signal at a reference frequency for use in the mixing stages to down-convert the received RF signals. The RF front end 218 can also include other circuitry, such as low-noise amplifiers (LNA), used in the processing of the received RF signals, and analog to digital conversion, as known to one of skill in the art.

The clock signal is also provided to the correlators 222 and replica generator 226 of the GNSS receiver 204. The replica generator 226 uses the clock signal in generating a replica of the down-converted signal for each channel. In particular, the replica generator 226 attempts to generate a replica signal that matches the code sequence and down-converted carrier frequency for each channel. The correlators 222 compare each generated replica with the respective down-converted signal. Based on the comparison, the correlators 222 output inphase (I) and quadrature phase (Q) samples for each channel, as known to one of skill in the art.

The I and Q samples are output to the pre-processor 228 in processing functionality 208. The pre-processor 228 calculates a code delay error, carrier frequency error and carrier power to noise density ratio (C/No) for each channel. The code delay error, carrier frequency error, and C/No are output to the Kalman filter 230. Based on the data received from the pre-processor 228, the Kalman filter 230 calculates corrections to estimated states such as position, velocity, acceleration, etc. Although a Kalman filter is specifically discussed herein, it is to be understood that other filters capable of providing the corrections to the estimated states can be used in other embodiments. The corrections are output to the INS 206. The INS 206 uses the corrections from the Kalman filter 230 to update estimated navigation states. The INS 206 then provides feedback, including position, velocity, acceleration and angular rate measurements, to the command generator 232.

The command generator 232 calculates code and carrier NCO commands for each channel based on the feedback from the INS 206. The NCO commands are then provided to the replica generator 226 for use in generating a replica of the down-converted signal on each channel. In this manner the navigation system 202 is able to respond to changes in the received RF signals, such as due to user motion. The code and carrier frequency commands provided as inputs to the replica generator 226 close the GNSS receiver signal tracking loops.

The amount of dynamic response capability of the navigation system 202 to respond to changes in the tracked GNSS signals is characterized by the frequency bandwidth of the tracking loop. As used herein the signal tracking loops include the correlators 222, the pre-processor 228, the Kalman filter 230, the INS 206, the command generator 232 and the replica generator 226. Under nominal conditions, the tracking loops are configured to have a narrow bandwidth because the wider the bandwidth, the more noise is inserted into the tracking function. In other words, the GNSS measurements that are used to solve for position and velocity would be degraded by the noise. Conversely, the narrower the bandwidth, the less noise is inserted into the tracking function which results in cleaner measurements.

However, the narrower the bandwidth, the more difficult it becomes for the tracking loops to maintain lock on a GNSS signal when a micro jump event occurs. In particular, a narrower bandwidth loop will degrade the GNSS receivers ability to react to clock step changes and, thus lose lock. For example, if the clock 224 undergoes a micro-jump, such as, due to a temperature induced stress, then the reference frequency used in down-converting the received RF signals will cause the down-converted signals to also undergo a frequency step change. Similarly, an error in the mixer or other component can also cause a frequency step change in the down-converted signals. To detect the occurrence of micro-jumps, navigation system 202 includes micro jump detection functionality 210. In particular, the micro jump detection functionality 210 monitors for a common error that develops on all of the multiple channels as indicative of a micro-jump. In this example, the micro jump detection functionality 210 monitors for a ramping buildup in the code delay error across all of the channels. In other examples, other errors common across all the channels are also monitored. For example, in some embodiments, the micro jump detection functionality 210 monitors an offset in the carrier frequency error measurement for all tracking channels. The carrier frequency error measurement is periodic rather than linear and provides a measurement of Doppler error. The offset in the carrier frequency error measurement can be used as a discriminator to help aid in detection of a micro jump event The code delay error for each channel is output from the pre-processor 228 to the micro jump detection functionality 210. Code delay error measurements are an indication of the delay in the received code sequence caused by relative movement of the GNSS satellite and GNSS receiver 204. For example, in the replica of a given GNSS signal, it is expected to receive each portion of the code at a given moment in time. However, the actual portion of the code received in the GNSS signal will be delayed or arrive earlier, due to the relative movement of the GNSS satellite and GNSS receiver 204. The code delay error is a calculation of the error in the code delay estimates.

The micro jump detection functionality 210 calculates an average code delay error across all the channels. The micro jump detection functionality 210 compares the average code delay error with a predetermined error threshold. For example, in some embodiments, the predetermined threshold is set to 0.1 chips. A chip refers to the period of time that a particular value in the code sequence is maintained. For example, the shortest time interval in which the code sequence can remain at a binary value of 1 without changing is a chip.

Notably, although the error threshold is expressed in units of chips, in this embodiment, it is to be understood that other quantities can be used for the threshold in other embodiments. For example, the threshold is described in units of time error or units of distance error, in other embodiments. A chip corresponds to the time interval for which the GNSS signals will travel between approximately 30 and 300 m of range depending on the particular code type being transmitted by the satellite used. Depending on the GNSS code being tracked, 0.1 chips could correspond to 0.1 of 29.3 (for GPS precision (P(Y)) code) or 293 meters (for GPS Coarse/Acquisition (C/A) code), for example.

Under nominal conditions, the average code delay error will be approximately equal to zero. However, when the average code delay error exceeds the predetermined error threshold, the micro jump detection functionality 210 initiates procedures to compensate for the effect of the micro-jump. In particular, the micro jump detection functionality 210 injects process noise covariance increments into the GNSS clock error states covariance model of the Kalman filter 230. In other words, the micro jump detection functionality 210 inserts an uncertainty increment in the Kalman filter covariance model for how much uncertainty exists in the various estimated quantities. In particular, it assigns the uncertainty to the frequency of the clock 224 and resulting time error values. For example, in some embodiments, the micro jump detection functionality 210 injects a clock phase increment of 15 meters, a clock drift increment of 5 meters/second, position increment of 5 meters per axis, and a velocity increment of 2 meters/second per axis. It is to be understood that the above values are provided by way of example and not by way of limitation. Different increment values can be injected in other embodiments. In addition, in other embodiments, a subset of the above mentioned measured quantities or other measured quantities are incremented.

The effect of inserting the uncertainty increments is to increase the bandwidth used in the tracking loops and to direct the Kalman filter to properly assign the common tracking errors to the clock 224. Thus, by increasing the bandwidth, the tracking loop is able to react to the micro jump and maintain lock on the tracked signals. In particular, covariance increments for the clock acceleration, clock drift, and clock phase error states are inserted to help account for an oscillator frequency shift. Insertion of covariance increments for the position and velocity error states help account for effects of a micro-jump on the navigation solution prior to detection of the micro-jump. As the Kalman filter 230 reacts to micro-jump, the uncertainty in the estimated quantities will decrease which results in a gradual return to the nominal narrow frequency bandwidth.

In some embodiments, only code delay aiding is enabled. Code delay aiding is the process of using code delay error measurements from the GNSS receiver 204 in the Kalman filter 230 to estimate system states and provide corrections to the INS 206. The INS 206 then provides information to the command generator 232 which generates NCO commands to the replica generator 226 to close the signal tracking loop and maintain GNSS signal track. In other embodiments, both code delay and carrier frequency aiding is enabled. Carrier frequency aiding is the process of using the Kalman filter 230 to estimate errors in the measurements of the received GNSS signal carrier frequency, as known to one of skill in the art. In embodiments that enable carrier frequency aiding, the procedures initiated by the micro jump detection functionality 210 also include disabling carrier frequency error measurements in the processing functionality 208 prior to injecting the uncertainty increments. Once the velocity and clock drift measurements re-converge, the carrier frequency error measurements are re-enabled.

Additionally, in some embodiments, the micro jump detection functionality 210 is configured to prevent multiple responses to the same detected micro jump event. In particular, when a micro jump event is detected, the micro jump detection functionality 210 first determines if a previous micro jump event has been detected within a pre-determined time limit. For example, in some embodiments, the micro jump detection functionality 210 determines if a previous micro jump event has been detected within the previous 30 seconds. If a micro jump event has been detected within the pre-determined time limit, it is likely that the subsequently detected micro jump event is the same as the previously detected micro jump event. Thus, the micro jump detection functionality 210 does not initiate procedures to respond to the subsequently detected micro jump event.

In addition, some micro jump events may involve a step change in frequency that cannot be mitigated using the procedures described above due to the magnitude of the step change. Thus, in some embodiments, the micro jump detection functionality 210 is configured to determine when such a micro jump event with a large magnitude has likely occurred. In particular, the micro jump detection functionality 210 calculates an average C/No across all the channels. The micro jump detection functionality 210 then compares the average C/No to a noise threshold. If the average C/No is less than the noise threshold, the micro jump detection functionality 210 determines that a large magnitude micro jump event has occurred and that the above procedures are unlikely to mitigate the effects of the micro-jump. The micro jump detection functionality 210 then causes control of the tracking loop for each channel to be released back to the GNSS receiver 204. This fast release of control over the tracking loops enables the GNSS receiver 204 to begin the process of reacquiring the GNSS signals faster. In other words, rather than taking time in an attempt to mitigate the effects of the micro jump event, the micro jump detection functionality 210 causes control of the tracking loops to be released so that the GNSS receiver 204 can begin reacquiring the GNSS signals. This fast release reduces the amount of time that the navigation system 202 operates without aiding from the GNSS receiver 204 in calculating the navigation parameters or solution. When operating without aiding from the GNSS receiver 204, the navigation system 202 relies on just the measurements from the INS 206.

Each of the GNSS receiver 204, the INS 206, the processing functionality 208 and the micro jump detection functionality 210 can be implemented using software, firmware, hardware, or any appropriate combination thereof, as known to one of skill in the art. For example, the micro jump detection functionality 210 can include or interface with hardware components and circuitry that support carrying out the various methods, process tasks, calculations, and control functions, used in the detection of micro jump events. By way of example and not by way of limitation, these hardware components can include one or more microprocessors, memory elements, digital signal processing (DSP) elements, interface cards, and other standard components known in the art. Any of the foregoing may be supplemented by, or incorporated in, specially-designed application-specific integrated circuits (ASIC) and field programmable gate arrays (FPGA).

Figure 2:
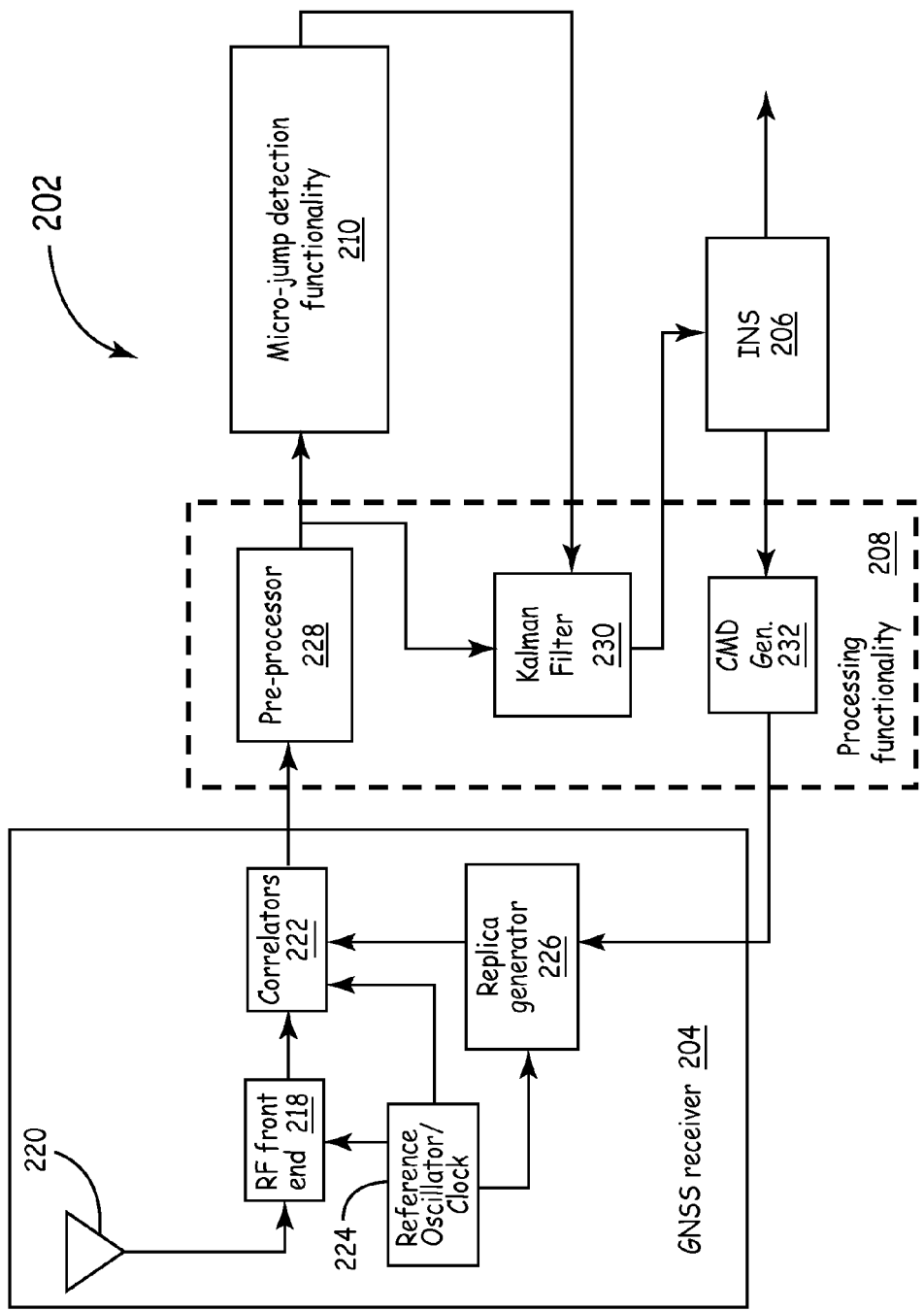
FIG. 2 is a block diagram of one embodiment of a navigation system.

In one implementation of the embodiment shown in FIG. 2, at least a portion of the GNSS receiver 204, INS 206, processing functionality 208 and micro jump detection functionality 210 are implemented in software that executes on a suitable programmable processor. For example, such a programmable processor can be implemented using a digital signal processor (DSP) that executes software that implements at least a portion of the functionality described herein as being performed by the GNSS receiver 204, INS 206, processing functionality 208 or micro jump detection functionality. Such software comprises a plurality of program instructions tangibly embodied on a processor-readable medium. In other examples, the programmable processor is a part of another type of programmable device such as an ASIC or FPGA.

The processor-readable medium can be implemented as any available media that can be accessed by a general purpose or special purpose computer or processor, or any programmable logic device. Suitable processor-readable media may include storage or memory media such as magnetic or optical media. For example, storage or memory media may include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), and flash memory, etc. Suitable processor-readable media may also include transmission media such as electrical, electromagnetic, or digital signals, conveyed via a communication medium such as a network and/or a wireless link.

Figure 3:
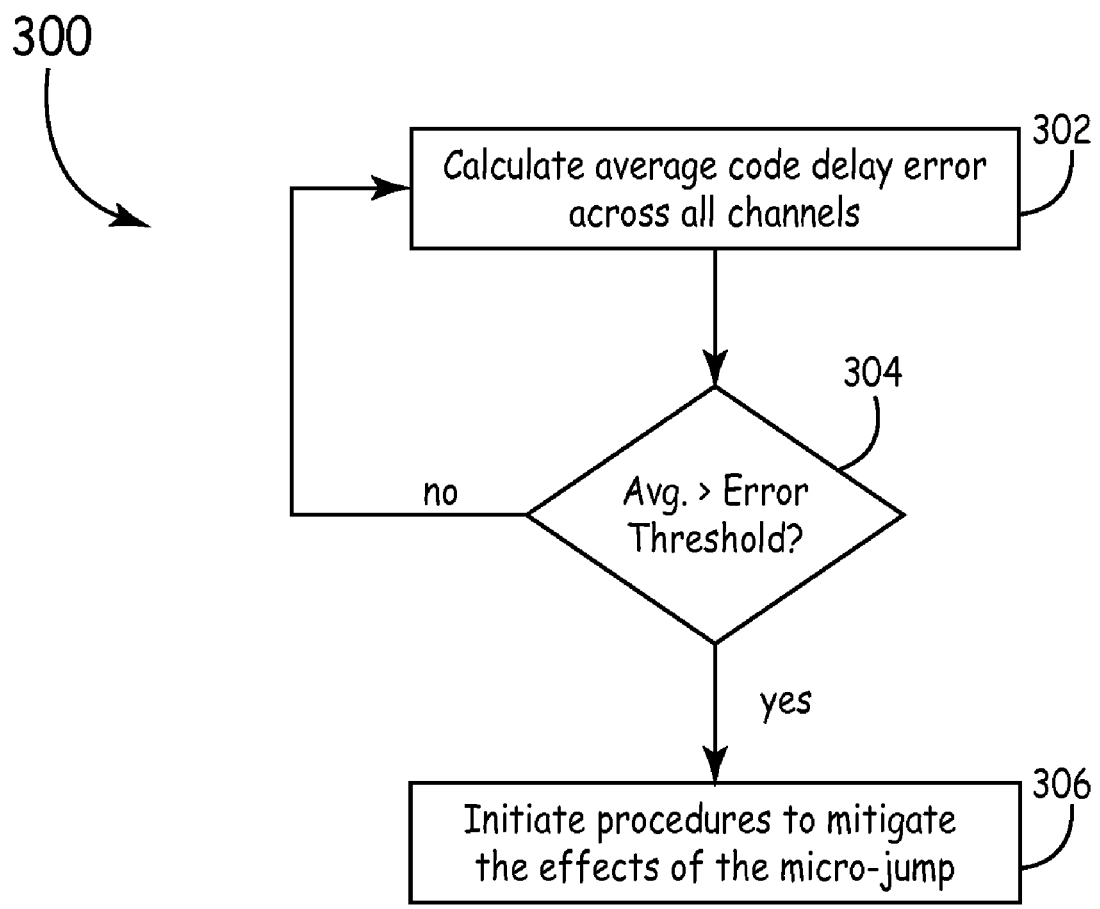
FIG. 3 is a flow chart of one embodiment of a method of compensating for micro jump events.

FIG. 3 is a flow chart of one embodiment of a method 300 of compensating for micro jump events. Method 300 can be implemented by the micro jump detection functionality 210 described above. In addition, method 300 can be implemented as instructions embodied on a processor-readable medium. Method 300 begins at block 302 where an average code delay error across all of the tracking channels is calculated. At block 304, the calculated average code delay error is compared to an error threshold. If the calculated average code delay error does not exceed the error threshold, method 300 returns to block 302 where the average code delay error is updated or recalculated as time advances and new code delay error values are calculated for the tracking channels.

If the calculated average code delay error exceeds the error threshold, procedures are initiated at block 306 to mitigate the effects of the micro jump event. For example, in some embodiments, clock state process noise covariance increments are injected into a Kalman filter used in controlling the tracking loop as described above. In other embodiments, other procedures can be initiated. For example, in some embodiments, the GNSS receiver is not operating in a deeply integrated mode. In such embodiments, the initiated procedures can include opening up the tracking bandwidth of each separately tracked channel directly with the GNSS receiver.

Figure 4:
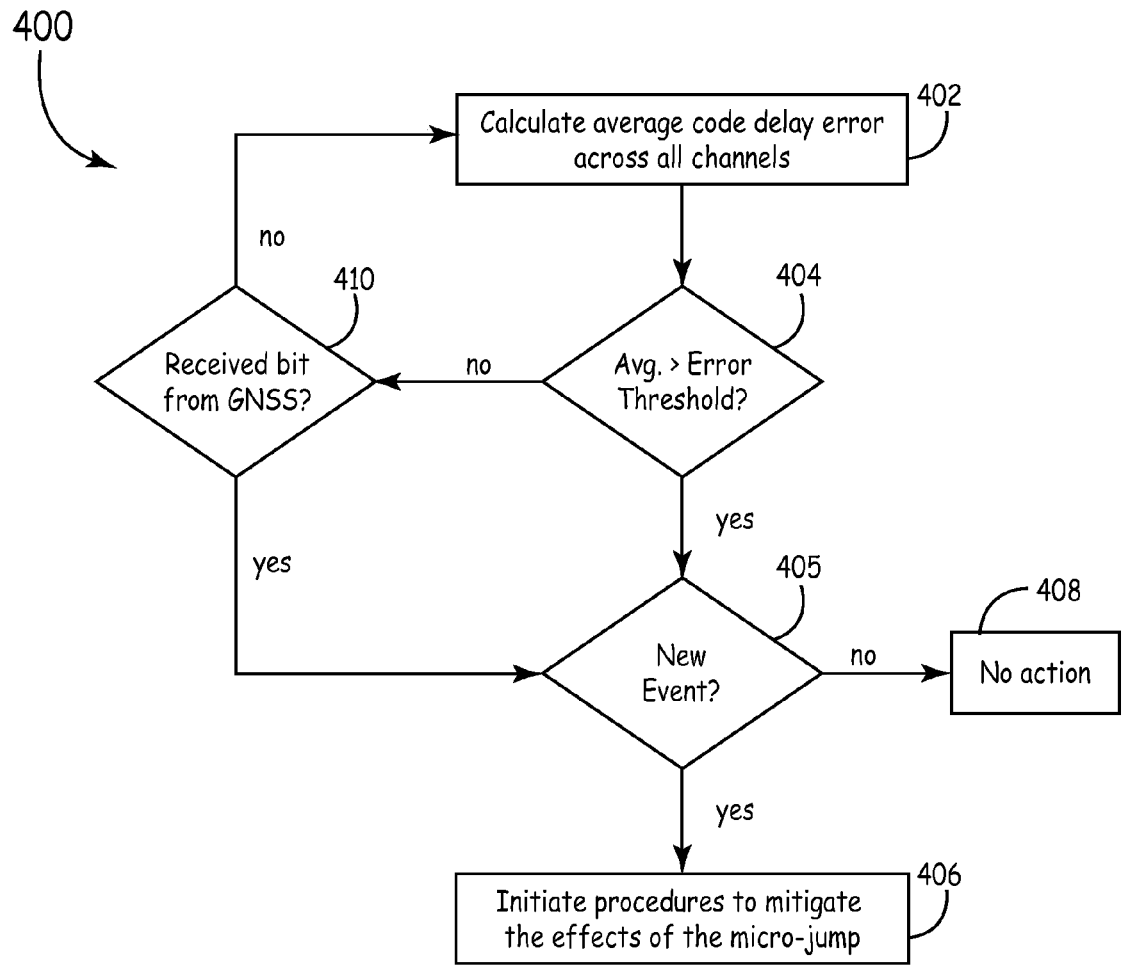
FIG. 4 is a flow chart of another embodiment of a method of compensating for micro jump events.

FIG. 4 is a flow chart of another embodiment of a method 400 of compensating for micro jump events. The acts performed in blocks 402, 404 and 406 are similar to the acts performed in blocks 302, 304 and 306, respectively, of method 300. Method 400 also includes additional acts. For example, at block 405, a check is performed to determine if the detected micro jump event is a new micro jump event. In particular, it is determined if a previously detected micro jump event has occurred within a predetermined time frame of the currently detected micro jump event. For example, a time difference between the previously detected micro jump event and the current detected micro jump event can be compared to an event threshold. The event threshold defines the time frame in which two detected micro jump events are considered to be the same micro jump event.

If a previously detected micro jump event did not occur within the predetermined time frame, procedures are initiated to mitigate the effects of the micro jump event at block 406. In this embodiment, clock state process noise covariance increments are injected into a Kalman filter. If a previously detected micro jump event did occur within the predetermined time frame, method 400 takes no action with respect to the currently detected micro jump at block 408. No action is taken because it is assumed that if a previously detected micro jump event was detected within the predetermined time frame, then the previously detected micro jump event and the current detected micro jump event are the same micro jump event.

Additionally, if the average code delay error does not exceed the error threshold at block 404, it is determined if a signal from the GNSS receiver has been received that indicates a detected micro jump event. For example, the GNSS receiver can be configured to output a frequency step bit for each channel. If a frequency step bit for any channel is received indicating a frequency step or micro jump event, it is determined at block 405 if the detected micro jump event is a new event. If it is a new event at block 405, the clock state process noise covariance increments are inserted to affect all the channels at block 406. In this way, the procedures to mitigate the effects of a micro jump event are initiated if either the average code delay error exceeds the error threshold or if a signal is received from the GNSS receiver indicating a micro-jump. In some embodiments, the signal from the GNSS receiver is not used because it typically has a slower response than the calculation of the average code delay error.

Figure 5:
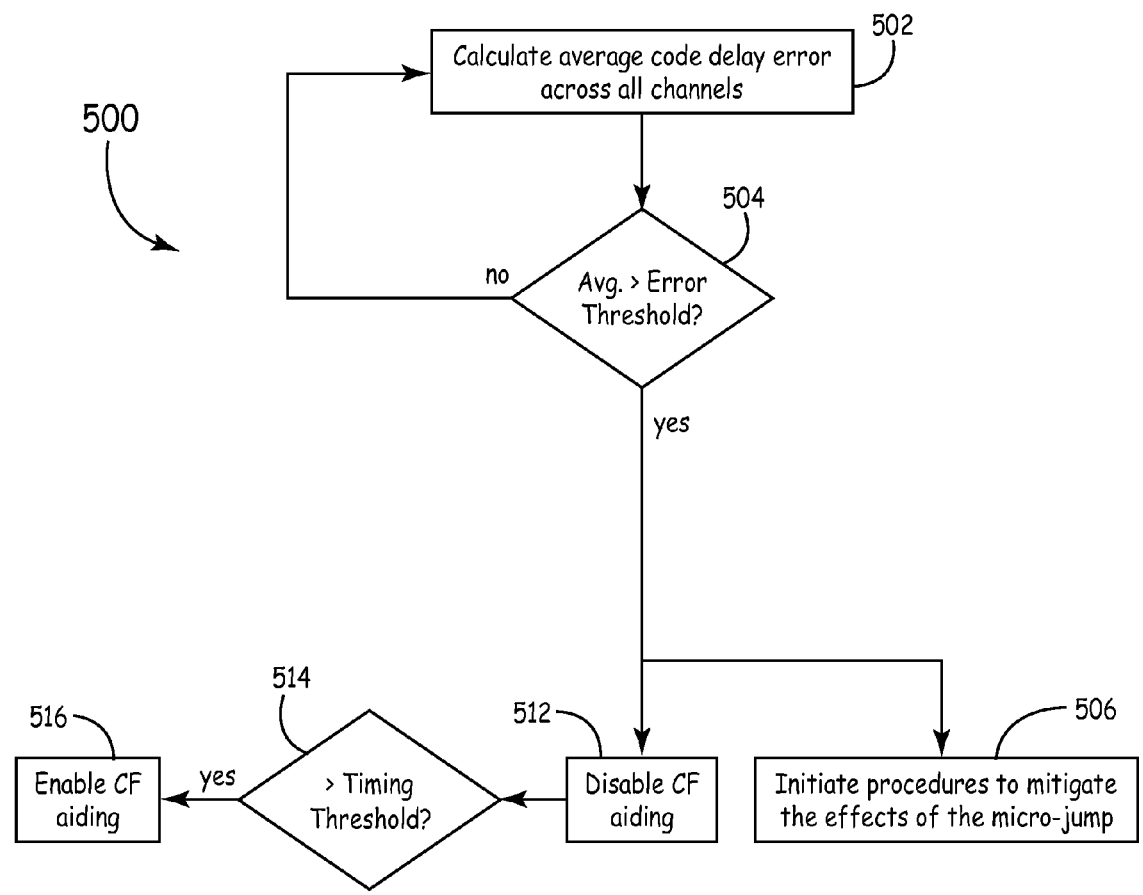
FIG. 5 is a flow chart of another embodiment of a method of compensating for micro jump events.

FIG. 5 is a flow chart of another embodiment of a method 500 of compensating for micro jump events. The acts performed in blocks 502, 504, and 506 are similar to the acts performed in blocks 302, 304, and 306, respectively, of method 300. Method 500 can be used in embodiments in which carrier frequency error measurements are also enabled in the Kalman filter. For example, in addition to initiating procedures, such as injecting process noise covariance increments, at block 506 when a micro jump event is detected, carrier frequency error measurement processing is also disabled at block 512. At block 514, it is determined if the time from the initial detected micro jump event is greater than the timing threshold. For example, in some embodiments, the timing threshold is set to 30 seconds. After the time from the initial detected micro jump event is greater than the timing threshold, the carrier frequency error measurement processing is re-enabled at block 516.

Figure 6:
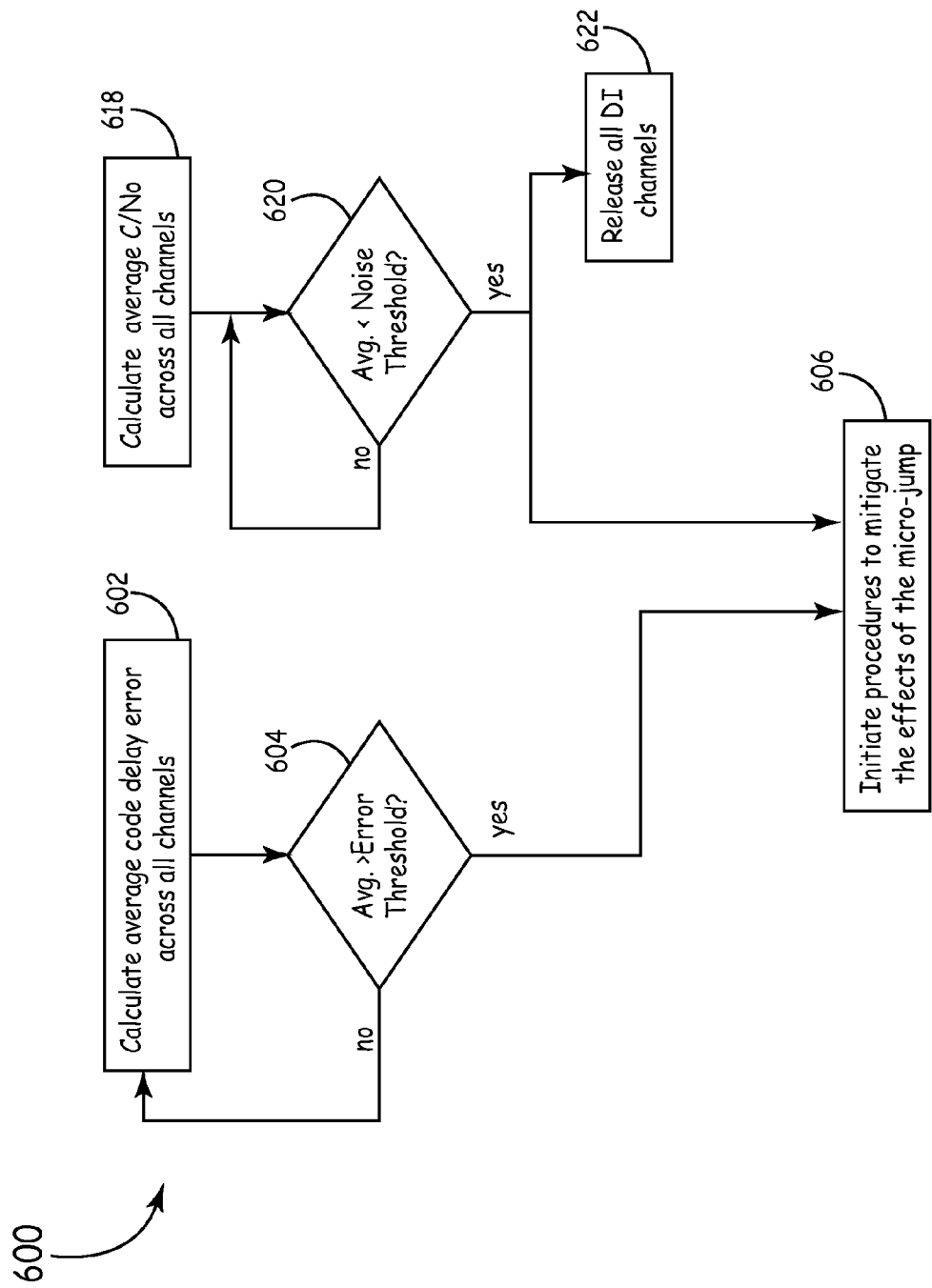
FIG. 6 is a flow chart of another embodiment of a method of compensating for micro jump events.

FIG. 6 is a flow chart of another embodiment of a method 600 of compensating for micro jump events. The acts performed in blocks 602, 604, and 606 are similar to the acts performed in blocks 302, 304, and 306, respectively, of method 300. In addition, method 600 calculates an average carrier power to noise density ratio (C/No) across all channels at block 618. At block 620, it is determined if the average C/No is less than a noise threshold. If the average C/No is less than the noise threshold, the procedures to mitigate the effects of the micro jump event, such as inserting clock state process noise covariance increments, are initiated at block 606. In addition, all deeply integrated channels are released back to the GNSS receiver. By releasing the channels back to the GNSS receiver based on the comparison of the average C/No with the noise threshold, the channels are released quickly to enable faster reacquisition of the GNSS signals. Thus, for micro jump events which are too large for the effects to be properly mitigated, reacquisition of the GNSS signals is begun more quickly than for smaller micro jump events for which the effects can be mitigated.

Although specific embodiments have been illustrated and described herein, it will be appreciated by those of ordinary skill in the art that any arrangement, which is calculated to achieve the same purpose, may be substituted for the specific embodiments shown. For example, it is to be understood that different combination of the acts described in methods 300-600 can be utilized in different embodiments. Therefore, it is manifestly intended that this invention be limited only by the claims and the equivalents thereof.

What is claimed is:

1. A system comprising:
a Global Navigation Satellite System (GNSS) receiver configured to acquire and track a unique radio frequency (RF) signal for each of a plurality of channels, wherein the GNSS receiver is configured to provide one or more system state measurements based on the unique RF signals;
processing functionality configured to calculate a respective code delay error for each of the plurality of channels based on the respective unique RF signal; and
micro jump detection functionality configured to calculate an average code delay error across all of the plurality of channels based on the plurality of calculated code delay errors, wherein the micro jump detection functionality is further configured to compare the calculated average code delay error to an error threshold to detect a micro jump event when the calculated average code delay error exceeds the error threshold.

2. The system of claim 1, further comprising a display unit configured to display the system state measurements.

3. The system of claim 1, wherein the micro jump detection functionality is further configured to initiate one or more actions that mitigate effects of the detected micro jump event when the calculated average code delay error exceeds the error threshold.

4. The system of claim 3, wherein the micro jump detection functionality is further configured to initiate one or more actions that mitigate effects of the detected micro jump event when a signal is received from the GNSS receiver indicating a micro jump event has occurred.

5. The system of claim 3, further comprising:
an inertial navigation system (INS) configured to provide one or more system state measurements;
wherein the processing functionality is configured to control tracking each unique RF signal for each respective channel in the GNSS receiver based on the system states measurements provided by the GNSS receiver and by the INS to the processing functionality; and
wherein the processing functionality comprises a Kalman filter configured to calculate corrections to estimated system states based on measurements from the INS and the GNSS.

6. The system of claim 5, wherein the micro jump detection functionality is further configured to inject process noise covariance increments into a covariance model for clock states of the Kalman filter when the calculated average code delay error exceeds the error threshold.

7. The system of claim 5, wherein the micro jump detection functionality is further configured to disable carrier frequency error measurements when the calculated average code delay error exceeds the error threshold.

8. The system of claim 5, wherein the processing functionality is further configured to calculate a carrier power to noise density ratio (C/No) for each channel; and
wherein the micro jump detection functionality is further configured to calculate an average C/No across all the channels and to release control of tracking the unique RF signal for each respective channel to the GNSS receiver when the average C/No is less than a noise threshold.

9. A method of compensating for a micro jump event, the method comprising:
calculating an average code delay error across a plurality of channels, each channel associated with a radio frequency (RF) signal being tracked by a Global Navigation Satellite System (GNSS) receiver, wherein each tracked RF signal contains a code sequence that is orthogonal to the code sequence of the other tracked RF signals;
comparing the calculated average code delay error to an error threshold to detect the micro jump event when the calculated average code delay error exceeds the error threshold; and
if the calculated average code delay error exceeds the error threshold, initiating one or more actions to mitigate effects of the detected micro jump event.

10. The method of claim 9, further comprising initiating the one or more actions to mitigate the effects of the detected micro jump event if a signal is received from the GNSS receiver indicating detection of the micro jump event.

11. The method of claim 9, further comprising:
calculating a time difference between a previous detected micro jump event and the current detected micro jump event if the calculated average code delay error exceeds the error threshold;
comparing the time difference to an event threshold; and
initiating the one or more actions to mitigate the effects of the detected micro-jump event only if the time difference exceeds the event threshold.

12. The method of claim 9, wherein initiating the one or more actions includes injecting process noise covariance increments into a covariance model for clock states of a Kalman filter.

13. The method of claim 12, further comprising disabling Kalman filter carrier frequency error measurements used in tracking the RF signals if the calculated average code delay error exceeds the error threshold.

14. The method of claim 9, further comprising
calculating an average carrier power to noise density ratio (C/No) across all of the plurality of channels;
comparing the calculated average C/No to a noise threshold; and
releasing control of tracking the RF signal for each respective channel back to the GNSS receiver when the average C/No across all of the plurality of channels is less than the noise threshold.

15. A program product comprising a processor-readable medium on which program instructions are embodied, wherein the program instructions are configured, when executed by at least one programmable processor, to cause the programmable processor to:
calculate an average code delay error across a plurality of channels, each channel associated with a radio frequency (RF) signal being tracked by a Global Navigation Satellite System (GNSS) receiver, wherein each tracked RF signal contains a code sequence that is orthogonal to the code sequence of the other tracked RF signals;
compare the calculated average code delay error to an error threshold to detect a micro jump event when the calculated average code delay error exceeds the error threshold; and if the calculated average code delay error exceeds the error threshold, initiate one or more actions to mitigate effects of the detected micro jump event.

16. The program product of claim 15, wherein the program instructions are further configured to cause the programmable processor to:
   initiate the one or more actions to mitigate the effects of the detected micro jump event if a signal is received from the GNSS receiver indicating detection of the micro-jump event.

17. The program product of claim 15, wherein the program instructions are further configured to cause the programmable processor to:
   calculate a time difference between a previous detected micro jump event and the current detected micro jump event if the calculated average code delay error exceeds the error threshold;
   compare the time difference to an event threshold; and
   initiate the one or more actions to mitigate the effects of the detected micro jump event only if the time difference exceeds the event threshold.

18. The program product of claim 15, wherein the program instructions are further configured to cause the programmable processor to:
   initiate the one or more actions by injecting process noise covariance increments into a covariance model for clock states of a Kalman filter.

19. The program product of claim 18, wherein the program instructions are further configured to cause the programmable processor to:
   disable Kalman filter carrier frequency error measurement processing used in tracking the RF signals if the calculated average code delay error exceeds the error threshold.

20. The program product of claim 18, wherein the program instructions are further configured to cause the programmable processor to:
   calculate an average carrier power to noise density ratio (C/No) across all of the plurality of channels;
   compare the calculated average C/No to a noise threshold; and
   release control of tracking the RF signal for each respective channel back to the GNSS receiver when the average C/No is less than the noise threshold.

* * * * *